Figure 2:
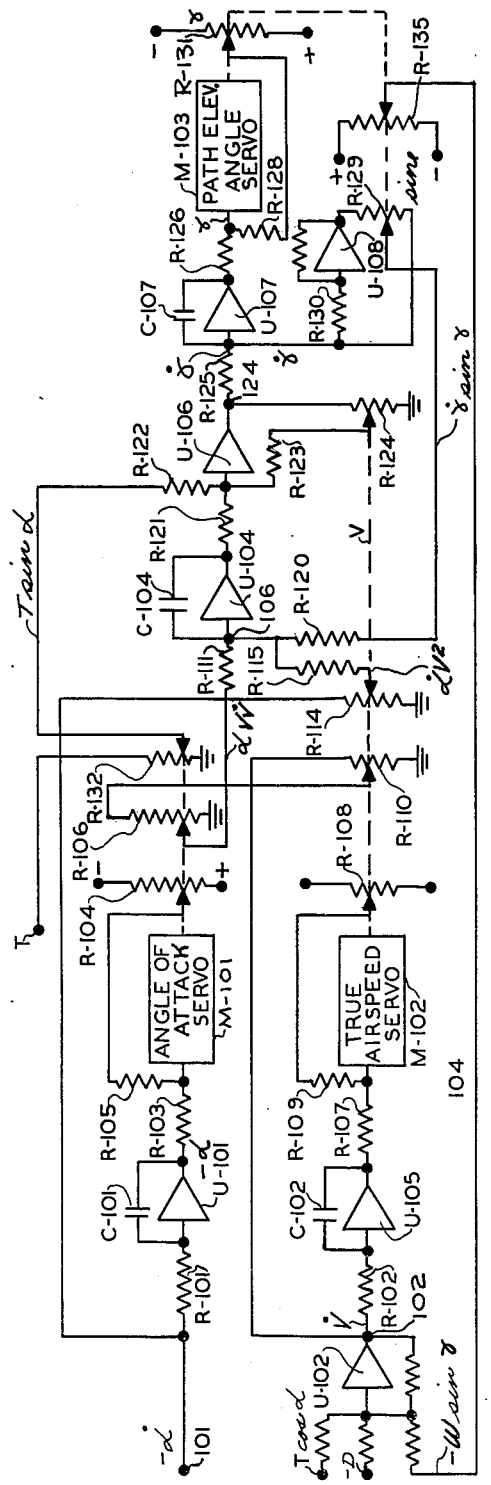

June 6, 1961

L. E. FOGARTY 2,986,821

FLIGHT SIMULATOR COMPUTER

Filed June 3, 1959

LAURENCE E. FOGARTY
INVENTOR

BY *Irving Kayton*
ATTORNEY

United States Patent Office

2,986,821
Patented June 6, 1961

2,986,821
FLIGHT SIMULATOR COMPUTER
Laurence E. Fogarty, Binghamton, N.Y., assignor to General Precision, Inc., a corporation of Delaware
Filed June 3, 1959, Ser. No. 817,772
5 Claims. (Cl. 35—12)

This invention relates to grounded flight training equipment and more specifically, to an improved grounded flight trainer computing portion for more realistically simulating steady-state flight.

As is well known to those skilled in the art, most modern grounded trainers and flight simulators solve the equations of motion of an aircraft by means of analog computer equipment to provide instrument and other output indications simulating those indications of actual aircraft instruments and indicators. The training value of such simulators is known to be related closely to the degree of precision with which the computers solve the steady-state and dynamic equations of motion of the aircraft being simulated.

The physical laws governing aircraft flight are such that aircraft velocity and aircraft climb angle are interrelated, so that analog computer servos or other devices computing these two simulated quantities are interconnected. As is also well known in the analog computer art, interconnected servos often tend to become unstable due to electro-mechanical servo limitations such as back-lash, lack of infinite resolution, friction, hysteresis, inertia, etc. In most prior art trainers, such servo limitations have resulted in simulators having a longitudinal instability manifested by an undesired "Phugoid"-type of oscillation in addition to the actual vertical motion of the aircraft being simulated. Though the oscillation is bounded, it has often been of sufficient magnitude to interfere considerably with the realism of the output indications associated with a simulator vertical system, so that the rate of climb indicator needle and the horizontal needle of many simulator gyro-horizon indicators have unrealistically oscillated up and down, even when the student has properly operated the simulator controls so that no oscillation would occur on the comparable instruments of an actual aircraft. Error in computing instantaneous simulated flight path elevation angle $\gamma$ and instantaneous simulated pitch angle $\theta$ may be seen to be less critical from a training standpoint during simulated flight conditions in which the simulated aircraft pitch attitude and rate of climb are changing, since small oscillations in the rate of change may be unnoticeable to the student. On the other hand, it will be seen that if the simulated aircraft should maintain a fixed pitch attitude, such as is commonly attained during cruising conditions at nearly straight and level flight with no sideslip, unwarranted oscillatory pitch bar and climb needle indications will be disconcerting and starkly unrealistic to a student pilot flying the simulator.

Longitudinal motion of an aircraft is described by the following general equation for the pitching rate $q_w$ of the simulated aircraft in its wind axis system:

$$mVq_w = f(T,\alpha,\beta) + g(V^2,C_L) - h(W \cos \gamma, \phi) \quad (1)$$

where $m$ is mass, $V$ is airspeed, $T$ is thrust, $\alpha$ is the angle of attack, $\beta$ is sideslip angle, $C_L$ is coefficient of lift, $W$ is gross weight of the aircraft, and $\phi$ is bank angle.

It may be seen from this expression, represented in generalized form, that in order to have an accurately simulated steady-state flight condition the pitching rate $q_w$ must be equal to zero. This can occur according to Equation 1 when the "thrust" factor, $f(T,\alpha,\beta)$, plus the "lift" factor, $g(V^2,C_L)$, is equal to the "weight" factor, $h(W \cos \gamma, \phi)$. It should be understood that the "thrust," "lift," and "weight" terms have dimensions of angular velocity ($q_w$ being the pitching rate) and as such these terms are proportional to an effect of thrust, lift and weight respectively rather than being directly proportional to "lift" and "weight" themselves. For reasons to be discussed in greater detail hereinafter, the thrust factor is of such negligible magnitude that it may be ignored for our purposes at this time, wherefore the requirement for steady-state simulation requires that the lift factor precisely balance the weight factor. When in actual aircraft the sum of these two factors as represented in Equation 1 do equal zero, steady-state conditions exist for longitudinal motion. This condition must be simulated in modern flight simulators, however, by generation of these functions from analog computing elements. Unfortunately, as an inspection of Equation 1 will indicate, any conventional analog computation of $q_w$ will involve the seeming necessity of either a multiplication or a division of a variable commensurate with the velocity of simulated flight V since the weight and lift terms of Equation 1 involve different powers of airspeed V. The problems of instability referred to above arise when this multiplication or division is accomplished by the usual electromechanical servo techniques. As a result, a part of the righthand side of Equation 1 will be stepped, giving rise to the probability that such an analog computer would not be able to establish a zero pitching rate $q_w$ representing steady-state flight even though the actual aerodynamic quantities would so require for accurate simulation. In addition, the resolution of aircraft weight W into that one of its components which is parallel to lift, requires the multiplication of W by cos $\gamma$ or the division thereof by secant $\gamma$. Similarly, the multiplication and trigonometric function resolution required by the expression $W \cos \gamma$ would further contribute to the instability in the longitudinal system when utilizing electromechanical components therefor. Although electronic multipliers known in the art could be used for the computation of the lift and weight terms of Equation 1 so as to provide a smooth function of their difference, these electronic components are expensive by comparison to electro-mechanical devices, are of poor reliability due to their complexity, and are insufficiently accurate.

A solution to the problem of providing a "smoothly" computed function for the righthand expression of Equation 1 by means of analog computational devices is presented in my copending application, Serial No. 676,953 filed August 9, 1957, for "Flight Simulation Computation" assigned to my present assignee. Central to that invention is the conversion, for analog computational purposes, of $V^2$ into the integral of $V\dot{V}$. In terms of analog computer circuitry, the product of airspeed and the time rate of change of airspeed is first obtained and then provided as the input to an electronic integrator. As is well known to those skilled in the art, all-electronic integrators such as the well-known Miller integrator circuit for example are characterized by a high degree of accuracy and an output potential which is greatly smoothed when compared to the output of an electromechanical integration or multiplication circuit. Consequently, an input potential to the integrator commensurate with $V\dot{V}$, which may well be a stepped or "noisy" function as a result of an electromechanical multiplication, will be integrated into a smooth output potential from the integrator circuit commensurate with $V^2$. Thus the seemingly redundant process of converting a simple multiplication computation into the more elaborate process of a multiplication followed by an integration, provides the highly desirable result of a smooth signal representative of $V^2$. Utilization of such technique and circuitry for the solution of the lift term of Equation 1 resulted in a significantly greater degree of longitudinal motion stability in modern flight simulators than was theretofore available.

It may be noted, however, that utilization of this circuitry for Equation 1 would result in the subtraction of a stepped or noisy "weight" term potential from a smooth lift term potential. Accordingly, some instability due to the lack of smoothness of the weight term would of necessity result. For many applications of modern day simulators, such a degree of stability is satisfactory. However, where the ultimate in stability is required the ideal solution would involve the smoothing out of the weight term.

It is the primary object of this invention, therefore, to provide flight simulating analog computing equipment which provides a degree of longitudinal stability, characterized by an absence of unrealistic vertical oscillations, heretofore unobtainable in analog computing grounded aircraft simulators.

The above object has been accomplished in accordance with the principles of the invention by obtaining an electronically "smooth" potential commensurate with the difference between the different weight terms of Equation 1 whereby the potential commensurate with $q_w$ constitutes the integral of the algebraic sum of the time derivatives of these two terms. It has been discovered that the weight term (momentarily for the purposes of discussion being considered to be equal to $W \cos \gamma$), which is effectively the component of weight $W$ in the direction parallel to the lift vector $L$ may be obtained by an integration process rather than the heretofore required multiplication and trigonometric vector resolution. The derivation of a potential commensurate with the weight term by an integration process provides the electronically smoothed term necessary for the high level of stability desired.

More specifically in accordance with the principles of the invention, the significant portion of the weight term ($W$ being considered constant with time for this type computation and for purpose of simplicity in exposition), is converted into the following form:

$$W \cos \gamma = \int_0^t \frac{d(W \cos \gamma) dt}{dt} = -\int_0^t W \dot\gamma \sin \gamma \, dt \quad (2)$$

Accordingly the product of $W$, $\dot\gamma$ and $\sin \gamma$ may be fed into an all-electronic integrator to obtain a potential commensurate with $-W \cos \gamma$ in a completely smoothed form. In this way vector resolution to provide an electronically smooth component is obtained by a plurality of multiplications followed by an electronic integration.

Although the "vector resolution by integration" thus described utilizes the weight term of Equation 1 by way of example for purposes of illustration, it should be understood that this computational arrangement may be utilized for obtaining noise-free potentials in any type of vector resolution computation. Thus the invention involves "resolving by integration" any resultant having a given magnitude into a component in accordance with any specified angle.

Accordingly it may be seen that a particularly advantageous feature of the invention is analog computational circuitry for the vector resolution of a resultant wherein the last stage of the computation is performed by an all-electronic integrator to provide a smooth output potential.

It is a further advantage of the invention that the total analog computation performed results in a smoothed difference function to provide an extremely high level of stability for the system represented by the equation solved.

Figure 1:
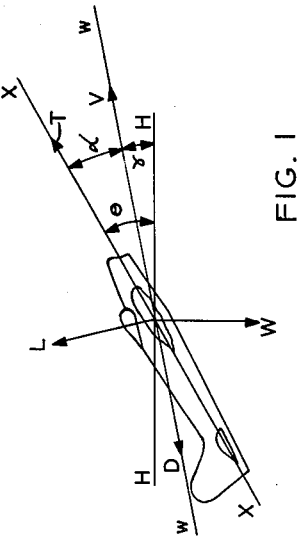

These and other objects and features of the present invention, the nature of the invention and its advantages will appear more fully upon consideration of the specific illustrative embodiment shown in the accompanying drawings and of the following detailed description. In the drawings:

FIG. 1 is a geometrical diagram illustrating the principal forces which act on an aircraft during unbanked and unyawed flight; and FIG. 2 is an electrical schematic diagram illustrating an exemplary embodiment of the invention, with only those portions of a modern flight simulator computing circuit shown which are necessary for an understanding of the invention; this portion of the computer emphasizes the vector resolution of the weight term in an electronically "smooth" manner.

Referring now to FIG. 1 there is shown a vector diagram illustrating (in the vertical plane only, for sake of clarity) the principal forces which determine the longitudinal motion of an aircraft. Assume that an aircraft pitched at a pitch angle $\theta$ is traveling with an airspeed $V$ along a flight path indicated by arrow $V$ at a flight path elevation angle $\gamma$ with respect to the horizontal H—H. The aircraft may have a drag force such as represented by vector $D$ acting rearwardly along the flight path axis W—W, a lift force such as represented by the vector $L$ acting normal to the flight path, a thrust force such as that represented by the vector $T$ acting along the aircraft longitudinal axis X—X at an angle $\alpha$ from the flight path, for example, and a weight force such as represented by vector $W$ acting downwardly. During steady-state flight the vector sum of all of these forces will add up to zero, and the aircraft will continue at a fixed velocity along the same flight path.

During steady-state flight there is no vertical oscillation and thus the pitching rate $q_w$ is zero as represented by the following expression, well known in the art:

$$mV q_w = T \sin \alpha \cos \beta + L - W \cos \gamma \cos \phi = 0 \quad (3)$$

where $L$, the lift term is a force term proportional to the effect of lift and a function of $V^2$. The lift term divided by $mV$ provides an angular rate proportional to the effect of lift. However, the expression usually solved in modern flight simulators is for $\dot\gamma$ (rate of change of path elevation angle) which is the same as $q_w$ under the conditions that sideslip angle $\beta$ and bank angle $\phi$ are zero. Thus in many prior art computers it has been usual to compute $\gamma$ by integrating $\dot\gamma$ with respect to time from the following expression which is obtained direction from (3):

$$mV\dot\gamma = T \sin \alpha + L - W \cos \gamma \quad (4)$$

This equation may be seen to express a summation of forces normal to the simulated flight path. The dynamic term $mV\dot\gamma$ may be seen from ordinary principles of mechanics to express centrifugal force acting perpendicular to the flight path. Expression 4 may be divided through by ($mV$) to illustrate the quantities which often have been fed as input voltages to a prior art $\gamma$ integrating servo; and $L$ is replaced by its definitive expression to obtain:

$$\dot\gamma = \frac{T \sin \alpha}{mV} + \frac{S\rho V^2 C_L}{2mV} - \frac{W \cos \gamma}{mV} \quad (5)$$

where $\rho$ is air density, and $S$ is the effective lift area of the simulated aircraft; the other terms have been previously defined. It will be seen that if a flight simulator is to be longitudinally stable, then during simulated flight conditions when there should be no change in path angle or pitch angle, the terms on the right-hand sides of the Equations 4 and 5 above all must add up to zero, so that $\dot\gamma$ (rate of change of path elevation angle) will be zero. Compared to the lift term and the weight term the $T \sin \alpha$ term of Expressions 4 and 5 is very small, and is especially small in jet aircraft which characteristically fly with hardly any angle of attack $\alpha$ at all. This term may be momentarily neglected for the purposes of the present discussion but will be discussed below in an appropriate context.

In order to have a simulated $\dot\gamma$ quantity of zero, it will be seen that the lift and weight terms, each of which are large and of opposite sense, must be exactly balanced against each other. The desired smoothness and accuracy in the computation of the algebraic sum of the lift and weight terms can be achieved in accordance with the principles of the invention so as to provide a zero output for simulated trimmed flight conditions. By expressing $\dot{\gamma}$ as the integral of the sum of the time derivatives of the lift and weight terms, the desired smoothness is achieved. Thus a smoothed computation of $$\dot{\gamma} = \frac{1}{mV}\left(\frac{S}{2}\rho V^2 C_L - W\cos\gamma\right) \qquad (6)$$

is achieved by converting (6) into $$\dot{\gamma} = \frac{1}{mV}\int_0^t \frac{d}{dt}\left(\frac{S}{2}\rho V^2 C_L - W\cos\gamma\right) dt \qquad (7)$$

Performing the differential operation indicated by (7) provides the following expression for the lift and weight terms in which $\dot{\gamma}$ is expressed as the integral of the sum thereof:

$$\dot{\gamma} = \frac{1}{mV}\int_0^t \left[\rho\frac{S}{2}(V^2\dot{C}_L + 2C_L V\dot{V}) + W\dot{\gamma}\sin\gamma\right] dt \qquad (8)$$

It may be noted that for the purpose of this computation air density $\rho$ and gross weight W vary so slowly with respect to time that they may be considered constant. Variation in these quantities may be fed into the computer as hand crank input changes, or may be introduced automatically by conventional simulator altitude and weight servos.

Considering FIG. 2, there is represented, for purposes of illustration, an exemplary analog computer portion of an aircraft flight simulator involving computer elements, all well known in the art, which are cooperatively arranged in accordance with the principles of the invention and which coact in the manner represented by the equations presented above. A potential commensurate with $\dot{\alpha}$ (rate of change of angle of attack) is shown applied via terminal 101 and scaling resistor R–101 to a conventional electronic integrator comprising operational amplifier U–101 and feedback capacitor C–101, thereby providing a potential commensurate with simulated angle of attack ($\alpha$), which is applied via input resistor R–103 to a conventional simulator position servo M–101. In this computation rate of change of angle of attack $\dot{\alpha}$ is used rather than rate of change of coefficient of lift $\dot{C}_L$ since $\dot{\alpha}$ is more conventionally available in most simulators and it is simply related to $\dot{C}_L$ by $\dot{\alpha} = f_1(M)\dot{C}_L$, where $f_1(M)$ is a function of Mach number and treated as a constant in most simulators. Servo M–101 is provided with a conventional rebalancing or follow-up potentiometer R–104, which applies a position feedback potential via scaling resistor R–105 to the input circuit of angle of attack servo M–101. Servo M–101 positions the arm of potentiometer R–106 for a purpose to be described below. Potentials commensurate with simulated longitudinal accelerations (i.e. acceleration due to thrust, $T\cos\alpha$, due to drag D, and due to weight $W\sin\gamma$) are applied to a summing circuit shown as comprising feedback amplifier U–102, thereby to provide a potential at terminal 102 commensurate with total simulated longitudinal acceleraton $\dot{V}$, which potential is applied via summing resistor R–102 to an electronic integrator circuit shown as comprising operational amplifier U–105 and feedback capacitor C–102. The output potential from the integrator, which potential is commensurate with simulated velocity (V), is applied via scaling resistor R–107 to the input circuit of true airspeed servo M–102. The conventional position servo M–102 includes rebalancing potentiometer R–108, which derives and applies a follow-up potential to the input circuit of servo M–102 via resistor R–109.

The longitudinal acceleration potential $\dot{V}$ at the output circuit of amplifier U–102 is applied to excite potentiometer R–110, the arm of which is positioned by airspeed servo M–102, thereby deriving a "velocity times acceleration" or $V\dot{V}$ potential. This potential is further modified in accordance with angle of attack $\alpha$ by means of potentiometer R–106, the arm of which is positioned by servo M–101, thereby providing a $V\dot{V}\alpha$ potential, which is applied via scaling resistor R–111 to the input circuit of an electronic integrator shown as comprising operational amplifier U–104 and feedback capacitor C–104. The rate of change of angle of attack, or $\dot{\alpha}$ potential from terminal 101 is also applied to excite potentiometer R–114, which is provided with a "square" or second power voltage versus shaft rotation characteristic and the arm of which is positioned by airspeed servo M–102, thereby deriving a $V^2\dot{\alpha}$ potential, which is applied via scaling resistor R–115 to the input circuit of electronic integrator U–104. A further potential commensurate with $W(\sin\gamma)\dot{\gamma}$ is derived by means of resolver potentiometer R–129 and applied via scaling resistor R–120 to the input circuit of electronic integrator U–104, the quantity W (aircraft weight) being assumed to be constant in the specific arrangement illustrated in Fig. 2.

Thus it will be seen that the resultant input potential to integrator U–104 comprises the following:

$$[k_1 V\dot{V}\alpha + k_2 V^2\dot{\alpha} - W\dot{\gamma}\sin\gamma] \qquad (9)$$

It may be noted that Expression 9 is the same as the integrand of Equation 8 with constants $k_1$ and $k_2$ having homologous counterparts therein. It is to be understood that scaling resistors are proportioned in Fig. 2 such that constants $k_1$ and $k_2$ have magnitudes directly proportional to their homologs in Equation 8. Integrating this quantity with respect to time as is done by integrator U–104 provides an output potential therefrom commensurate with $$[kV^2\alpha - W\cos\gamma]_0^t \qquad (10)$$

It may be seen that excepting the factor $$\left(\frac{1}{mV}\right)$$

Expression 10 is the same as Equation 6 for $\dot{\gamma}$ with $k$ having its homologous counterpart therein.

It should be noted that while each of the input potentials applied to electronic integrator U–104 are potentiometer-derived and subject to usual electromechanical limitations, the output potential from integrator U–104 will not exhibit step jumps, and step variations in the input potentials will not prevent the output potential from the integrator from remaining steadily at or near zero.

The output potential from integrator U–104 is applied via resistor R–121 a conventional analog division circuit shown as comprising operational amplifier U–106 and potentiometer R–124. The wiper arm of potentiometer R–124 is positioned in accordance with simulated airspeed V by means of airspeed servo M–102, and the wiper arm voltage is connected to the input circuit of amplifier U–106 via scaling resistor R–123, so that the output potential at terminal 124 is commensurate with the integrator output divided by $mV$. As a consequence a potential commensurate with Equation 6, $\dot{\gamma}$, is applied via resistor R–125 to an integrator comprising operational amplifier U–107 and feedback capacitor C–107. The output potential from resistor R–126 is thus directly proportional to $\gamma$ and serves to drive a conventional position servo M–103 which positions the arm on rebalancing potentiometer R–131 to provide a control loop including resistor R–128 to the input of servo M–103.

The input lead to integrator U–107 supporting the potential commensurate with $\dot{\gamma}$ is tapped to excite sine potentiometer R–129 which includes scaling resistor R–130 and an inverting amplifier U-108. The arm of R-129 is positioned by γ servo M-103 whereby a potential commensurate with the product $W\dot{\gamma} \sin \gamma$ is derived and applied to integrator U-104 via resistor R-120, as previously explained.

The γ servo M-103 positions the arm of shaped sine potentiometer R-135 whereby a potential commensurate with $W \sin \gamma$ is derived and applied via conductor 104 to the input of the $\dot{V}$ amplifier U-102 wherein it is utilized as one of the forces in the computation of $\dot{V}$ as previously described.

The thrust term $T \sin \alpha$ of Equation 5 as previously explained, is so small compared to the lift and weight terms that for steady state flight conditions it may be neglected. Any component due to this term would be so small that its effect upon the simulated instruments would not ordinarily be noticed by the student pilot. However for transient flight conditions this term may contribute a sufficient effect so that its contribution would and should be noticed by the student pilot. Accordingly there is represented in Fig. 2 means for including this term in the computation. A potential commensurate with thrust T, derived conventionally elsewhere in the computer, excites shaped sine potentiometer R-132 whereby the wiper positioned by α servo M-101 derives a potential commensurate with $T \sin \alpha$ which is applied via scaling resistor R-122 to amplifier U-106 and thus is operated upon in the division circuit previously described. In this arrangement the thrust term is added subsequent to the smoothing process performed by integrator U-104 upon the weight and lift terms. If desired the thrust term may also be included in the smoothing process by utilizing "resolution by integration" equation similar to Equation 2 (but differentiating the sine rather than the cosine) for converting the thrust term into a time rate form for application to the input of integrator U-104.

It is contemplated that high quality amplifiers be used in the embodiment of Fig. 1. In any event, standard drift correction methods and means may be employed where desired, for example, by providing a parallel electro-mechanical computation with a long time-constant correction signal.

Although a computer portion of a simulator has been shown adapted for operation in the wind axis system, computations may be performed in accordance with the invention in any axis system desired by mechanically employing the standard axis translation and/or rotation techniques or equations well known to those skilled in the art. Furthermore, it is to be understood that the above-described arrangement is merely illustrative of one application of the principles of the invention. Numerous other arrangements may be devised by those skilled in the art without departing from the spirit and scope of the invention.

What I claim is:

1. Grounded aircraft simulator apparatus for solving an equation expressing longitudinal motion of a simulated aircraft, comprising in combination; means for deriving a first potential commensurate with the time rate of change of airspeed of said simulated aircraft; means including a first servomechanism responsive to said first potential and operative to provide a simulated airspeed quantity; first potentiometer means excited in accordance with said first potential and positioned in accordance with said simulated airspeed quantity for providing a second potential; means including a second potentiometer operable to modify said second potential in accordance with simulated angle of attack of said simulated aircraft for providing a first lift factor potential; means for deriving a third potential commensurate with simulated rate of change of angle of attack of said simulated aircraft; means including a third potentiometer operable to modify said third potential in accordance with a function of said simulated airspeed quantity to provide a second lift factor potential; resolver means for providing a weight factor potential; means for combining and integrating said lift factor and weight factor potentials and means responsive to the integrated potentials and said simulated airspeed quantity for providing a quotient potential commensurate with simulated rate of change of path elevation angle; a second electronic integrator operable to integrate said quotient potential with respect to time to provide a simulated path elevaion angle potential; and a servomechanism connected to be operated in accordance with said simulated path elevation angle potential mechanically connected to operate said resolver means, said resolver means being connected to be excited in accordance with said quotient potential.

2. Aircraft trainer computer apparatus for solving an equation which expresses longitudinal-vertical motion of a simulated aircraft to provide simulated path elevation angle and airspeed quantities, comprising in combination; first computer means including means for summing a plurality of potentials commensurate with thrust, drag and weight components acting longitudinally along the flight path of said simulated aircraft for providing a first potential commensurate with time rate of change of airspeed of said simulated aircraft; second computer means including a first servomechanism responsive to said first potential for providing a simulated airspeed quantity and a second potential commensurate with the product of airspeed and rate of change of airspeed; means for deriving a third potential commensurate with simulated rate of change of angle of attack; means responsive to said third potential for providing a simulated angle of attack quantity; first potentiometer means excited in accordance with said second potential and positioned in accordance with said simulated angle of attack quantity for providing a fourth potential; second potentiometer means excited in accordance with said third potential operable to modify said third potential in accordance with the square of said simulated airspeed quantity for providing a fifth potential; resolver means for providing a simulated weight factor potential; means including a first electronic integrator for adding said lift factor and weight factor potentials and for integrating he added potentials with respect to time to provide a sixth potential; means responsive to said airspeed quantity for dividing said sixth potential by airspeed to provide a quotient potential commensurate with simulated time rate of change of flight path elevation angle; a second electronic integrator operable to integrate said qoutient potential with respect to time to provide a simulated path elevation angle potential; and a second servomechanism connected to be operated in accordance with said simulated flight path elevation angle potential, said second servomechanism being mechanically connected to operate said resolver means, said resolver means being connected to be excited in accordance with said quotient potential.

3. Apparatus according to claim 2 having further means for deriving a thrust component potential and for adding said thrust component potential to said sixth potential.

4. Apparatus according to claim 2 in which said second computer means comprises a third electronic integrator operable to integrate said first potential with respect to time to provide a simulated airspeed voltage, and in which said first servomechanism comprises a position servomechanism operable to provide an output position commensurate with said simulated airspeed quantity.

5. Apparatus according to claim 2 in which resolver means is connected to provide the recited weight component potential which is summed in said first computer means.

(References on following page)

References Cited in the file of this patent

UNITED STATES PATENTS

| | | |
|---|---|---|
| 2,622,231 | Gray | Dec. 16, 1952 |
| 2,712,184 | Ziebolz et al. | July 5, 1955 |
| 2,775,124 | Gardner et al. | Dec. 25, 1956 |
| 2,858,623 | Stern et al. | Nov. 4, 1958 |

FOREIGN PATENTS

| | | |
|---|---|---|
| 780,779 | Great Britain | Aug. 7, 1957 |

OTHER REFERENCES

Electronic Analog Computer (text), Korn and Korn, 2nd Ed., 1956, McGraw Hill Book Co.